United States Patent [19]
Morgan et al.

[11] Patent Number: 5,920,325
[45] Date of Patent: Jul. 6, 1999

[54] PRIORITIZATION OF BACKGROUND DISPLAY DURING ANIMATION

[75] Inventors: Scott Anthony Morgan; Craig Ardner Swearingen, both of Austin, Tex.

[73] Assignee: International Business Machines Corporation, Armonk, N.Y.

[21] Appl. No.: 08/753,077

[22] Filed: Nov. 20, 1996

[51] Int. Cl.[6] .................................................. G06T 13/00
[52] U.S. Cl. .................. 345/473; 345/115; 345/433; 345/435; 345/344; 345/522
[58] Field of Search ....................................... 345/115, 433, 345/435, 344, 473, 522

[56] References Cited

U.S. PATENT DOCUMENTS

| | | | |
|---|---|---|---|
| 4,868,552 | 9/1989 | Chang | 340/721 |
| 5,031,117 | 7/1991 | Minor et al. . | |
| 5,245,700 | 9/1993 | Fossum . | |
| 5,276,783 | 1/1994 | Fossum . | |
| 5,283,860 | 2/1994 | Einkauf et al. . | |
| 5,479,602 | 12/1995 | Baecker et al. . | |
| 5,487,145 | 1/1996 | Marsh et al. . | |
| 5,500,933 | 3/1996 | Schnorf . | |
| 5,517,663 | 5/1996 | Kahn . | |
| 5,553,222 | 9/1996 | Milne et al. . | |
| 5,555,368 | 9/1996 | Orton et al. . | |

OTHER PUBLICATIONS

"Dial 1–800–Internet", BYTE Magazine, Feb., 1996, pp. 83–88.
"Hey Baby, Call Me at My IP Address", BYTE Magazine, Apr., 1996, pp. 142–144.

*Primary Examiner*—Mark K. Zimmerman
*Assistant Examiner*—Chanté Harrison
*Attorney, Agent, or Firm*—Volel Emile; Mark E. McBurney

[57] ABSTRACT

A system and method is provided that causes an animation sequence and underlying background process to be in step such that the motion of the animation is coordinated with the painting of the display by the underlying process. A mechanism is used to adjust the thread priority of the animation thread. When the animation is starting, the priority of the animation threads is set to BELOW_NORMAL priority. The animation process is then implemented. Subsequently, the animation threads are set back to NORMAL priority. Because the priority of the animation threads is below normal the other, contending processes will react more quickly (due to their higher priority) during the animation process. This will cause the other processes to update (paint) their client areas more quickly. Each change to another processes client area will cause an update to that area, since that other process will have a higher priority relative to the animation sequence.

18 Claims, 10 Drawing Sheets

PRIORITIZATION OF BACKGROUND DISPLAY DURING ANIMATION

CROSS REFERENCE TO RELATED APPLICATIONS

The present application is related to the following applications: Ser. No. 08/753,081, entitled "Creating Real-World Objects"; Ser. No. 08/753,082, entitled "Data Processing System and Method for Controlling a View of a Realistic Object in a Display Device"; Ser. No. 08/753,122, entitled "Multifunctional Object"; Ser. No. 08/753,076, entitled "System and Method for Maintaining Size and Position Relationships for Non-Rectangular Real World Objects"; Ser. No. 08/753,124, entitled "Data Processing System and Method for Scaling a Realistic Object on a User Interface"; Ser. No. 08/753,078, entitled "Data Processing System and Method for Viewing Objects on a User Interface"; Ser. No. 08/753,123, entitled "Data Processing System and Method for Performing Automatic Actions in a Graphical User Interface"; and Ser. No. 08/753,123, entitled "A Data Processing System and Method for Modifying a Size of a Realistic Object on a User Interface". All of the above applications are being filed on the same date as the present application and assigned to the assignee of the present application.

BACKGROUND OF THE INVENTION

The present invention relates to a data processing system for creating a representation of a real-world, non-standard, complex objects in a graphical user interface (GUI). More particularly, a process is utilized that allows the areas of a display which become hidden by an image during animation sequences to be quickly and efficiently refreshed when the animation image no longer obscures the area.

Object oriented programming is a known technology which encapsulates data and methods into a programming entity called an object. By protecting certain methods and data through a public interface, an object oriented program can insulate each component from changes to other components yet provide the needed functions with a minimum of reprogramming. For more background information on object oriented technologies, concepts and conventions, please see the following references, *Object Oriented Design with Applications*, Grady Booch (The Benjamin/Cummins Publishing Company, 1990) and *Object Oriented Software Construction*, by B. Meyer, (Prentice Hall, 1988).

Typically, graphical user interfaces, everything is present in terms of windows, which include items such as a size border, rectangular client, menu, title bar and the like. These items are not found in real-world objects, such as a telephone or a book that sits on a user's desk. Current data processing technology is moving towards displaying these real-world objects on the computer screen. It is very desirable to have the real-world object on the GUI desktop appear very similar to what a user experiences in real life.

With advances in computer technology, such as the increased availability of high frequency microprocessors and multiprocessing operating systems, software animation is becoming more and more common. When implementing software animation it is important to remove the old (existing) image and to display the new image as fast as possible. Otherwise the visual effect is compromised and realistic, life like motion is not achieved.

Typically, software animation occurs as a result of a single foreground process. In this case, the animation steps are as synchronous as possible when using a multi-threaded operating system, such as Windows and the OS/2 operating system. For this example, the area of animation is also considered to be within the foreground processes for the window client area.

However, if the area of animation is on a desktop, then there are multiple processes. For example, there may be one program operating in each window opened on the desktop, as well as the desktop itself. Each of these processes are competing for time slices on the processor. During an animation sequence, portions of the screen will be intermittently displayed and then hidden by the animation image. If the animation process is above a window containing a word processing program, then the animation thread (process) will be competing with a thread from the word processing program for the screen area that overlaps. In a conventional system, the word processing thread and the animation sequence threads will be treated equally when contending for a time slice of the processor. Thus, the performance of the animation sequence will suffer, due to its contention with the word processing thread. This causes an inconsistent recovery for the animation thread that occurs from the contention with other processes, when their windows need painting.

A particular example of this is a desktop object, such as a real world telephone which includes a drawer. Both objects are children of the desktop, just like any other window applications running on the desktop. When a user selects the telephone drawer handle, the drawer animates in and out over the desktop. Anything underneath the drawer will then require painting (either to be painted as the drawer when it is opened, or to paint the underlying process when the drawer is closed). While the animation sequence is occurring, it is possible (at anytime) for the underlying process to get a time slice to do its painting, which causes the animation to be inconsistent and out of step. This gives the animation sequence a rough, jerky, unrealistic appearance to a user.

Therefore, it can be seen that a need exists for a system and method which provides for a smooth, life like, realistic animation sequence when a user is manipulating a "real-world" type image.

SUMMARY OF THE INVENTION

In contrast to the prior art, the present invention provides a system and method that allow realistic motion to occur on a computer display when a user manipulates a real world object and initiates an animation sequence.

Broadly, the present invention provides a system and method for causing the animation sequence and the background process to be in step (synchronized). That is, the motion of the animation must be coordinated with the painting of the underlying window. For example, when the animation motion reveals the underlying window, the speed at which the animation motion is occurring should substantially match the speed at which the underlying window is being painted. A mechanism is used to adjust the thread priority of the animation thread.

When the animation is starting, the priority of the animation threads is set to BELOW_NORMAL priority. The animation process is then implemented. Subsequently, the animation threads are set back to NORMAL priority. Because the priority of the animation threads is below normal the other, contending processes will react more quickly (due to their higher priority) during the animation process. This will cause the other processes to update (paint) their client areas more quickly. Each change to another processes client area will cause an update to that area, since that other process will have a higher priority relative to the animation sequence. Thus, in the previous example, the word processing thread will have a higher priority than the animation thread and will refresh its display area more frequently giving a smoother appearance relative to the animation motion going on above it.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

The telephone object of the present invention is a user interface design for a new, real-world user interface style. It is built using C++ and implements a reusable framework. A shortcut function allows the properties page of the telephone's shortcut icon to assign a shortcut key. This will allow a user to access the phone at any time. For example, the shortcut key will bring the telephone to the top when it is covered by other windows. Also, the phone will automatically answer if it's ringing when the user presses the shortcut key.

Additionally, one embodiment of the telephone object of the present invention will allow the object to be fully displayed during moving and sizing. This dynamic display of the object during sizing can be implemented by using a software program such as "Plus" from Microsoft Corp. It is also possible to display the traditional outline box during resizing.

During dialing, the user can insert a pause by entering a comma (,) for a 2 second pause or semicolon (;) to wait for another dial tone.

Telephone numbers are often made up of names or acronyms that are easy to remember, but difficult to dial on a real phone (for example, 1-800-CALLIBM). With the telephone object of the present invention a user can just type the letters on the keyboard. The present invention translates the letters to the desired phone number, and automatically dials the number.

The telephone object of the present invention is also capable of combining speed dial numbers with numbers keyed in by the user. For example, if 9 must be dialed to get an outside line, a user can just enter the numeral 9 and then select the speed dial button.

The present invention is implemented such that a user can close the "object", if required by the specific operating system. However, the present invention supports operating systems wherein closing the object by the user is not a necessity. In a preferred embodiment the telephone object of the present invention supports closing the object as required by the majority of current operating systems, such as Windows 95 (available from Microsoft Corp). This closing, and other functions, is implemented through a pop-up menu. Just select the telephone object (e.g. by clicking a first mouse button over the object to see the pop-up menu, and then clicking a second button over the option to be selected by the user.

The telephone object of the present invention has been designed to work in much the same way as a physical telephone located on a desk, wall, car or pocket. But, unlike a physical telephone, it works through the computer. The present invention takes advantage of the functions that computers are so good at, such as remembering names and numbers, finding and entering (dialing) the number quickly. The present invention allows a user to answer and place calls without picking up a physical handset.

Some of the differences between the present invention and other telephone applications are that the telephone object of the present invention always displays the image of a real telephone regardless of how the user is currently interacting with it. Further, the object of the present invention does not need a window border around it; it sits right on your desktop. It is recognizable at any size, and can be made as big or as small as desired without interfering with its functions. Even when the object is displayed as an icon, it can be used to answer calls or dial the user's speed-dial numbers, or to dial a number manually using the keyboard.

A user can dial numbers manually either by clicking on the phone object's keypad with the mouse, or by using the computer's number keys. (You can even type in the letters for telephone numbers such as 1-800-CALLIBM.) When a person being called answers, just start talking. The present invention telephone object uses the microphone and speaker provided with the user's computer system such that hands-free conversation is possible. When the user has completed the telephone conversation click on the handset portion of the object to hang up.

To receive an incoming call, the user answers by again selecting the handset portion of the object and begin talking.

The present invention also includes a speed-dial function. The speed-dial can be set during the time period when a telephone conversation is occurring or after the call is finished. The speed-dial may be set to allow access to numbers which are called often, or to emergency numbers. To set the speed-dial function, click on the handle portion of the drawer, which is located at the bottom edge of the telephone object. The drawer will slide open, displaying an area where the speed-dial buttons can be set. That is, type the name of the person, or entity, to which speed-dial access is desired, then fill in the desired telephone number in the Number field and press the Add Name button. The name and number will appear in the list above the entry fields. Next, press the Set Speed Dial key. In response, the speed-dial buttons will flash. Select the button you want to assign to this speed-dial number. The name and number entered by the user will appear beside its associated speed-dial button. When the speed-dial number is set, the user selects the handle of the drawer to return it to its original position.

The telephone object of the present invention can be displayed as it first appeared, with both the number pad and the speed-dial buttons, or in a simpler state, the base function view. To change between these presentations, a toggle switch located on the telephone object just above the speed-dial buttons is selected. In order to stretch or shrink the telephone object, the user can move the mouse pointer over any edge of the phone object. The pointer will change to a diagonally oriented sizing pointer. While this new pointer is showing, press down the left mouse button and drag the edge of the telephone object to change its size. No matter how large or small you make it, the telephone object can still be used.

In a preferred embodiment, the present invention is implemented in the C++ programming language using object oriented programming techniques. C++ is a compiled language. The programs are written in human readable script and this script is provided to another program called a compiler to generate a machine readable numeric code which can be loaded into, and directly executed by the computer. The C++ language possesses certain characteristics which allow a software developer to easily use programs written by others while still provided a great deal of control over the reuse of programs to prevent their destruction or improper use. The C++ language is well known and many articles and text are available which describe the language in detail.

As known by those skilled in the art, object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and presents the program from being run.

Polymorphism allows objects and functions which have the same overall format, but which work with different data, to function differently to produce consistent results. For example, an addition method may be defined as variable A+variable B, (A+B). The same format can be used whether the A and B are numbers, characters or dollars and cents. However, the actual program code which performs the addition may differ widely depending on the type of variables which comprise A and B. Thus, three separate method definitions can be written, one for each type of variable (numbers, characters and dollars). After the methods have been defined, a program can later refer to the addition method by its common format (A+B) and, during compilation, the C++ compiler will determine which of the three methods to be used by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

Although object oriented programming offers significant improvements over other programming concepts, program development still requires significant outlays of time and effort, especially if no pre-existing software programs are available for modification. Consequently, a set of predefined, interconnected classes are sometimes provided to create a set of objects and additional miscellaneous routines which are all directed to performing commonly encountered tasks in a particular environment. Such predefined classes and libraries are typically called "frameworks" and essentially provide a prefabricated structure as a basis for creating a working application program.

For example, a framework for a user interface might provide a set of predefined graphic interface objects which create windows, scrollbars, menus and the like, and provide the support and "default" behavior for these graphical interface objects. Since many frameworks are based on the object oriented techniques, the predefined classes can be used as base classes and the built in default behavior can be inherited by developer defined subclasses and either modified or overridden to allow developers to extend the framework and create customized solutions in a particular area of expertise. This object oriented approach provides a major advantage over traditional programming since the programmer is not changing the original program, but rather extending the capabilities of the original program. In addition, the framework provides architectural guidance and modeling and, at the same time, frees the developers to supply specific actions unique to the problem domain.

Therefore, those skilled in the art will understand how the present invention is implemented using object oriented programming techniques as described above.

Figure 1:
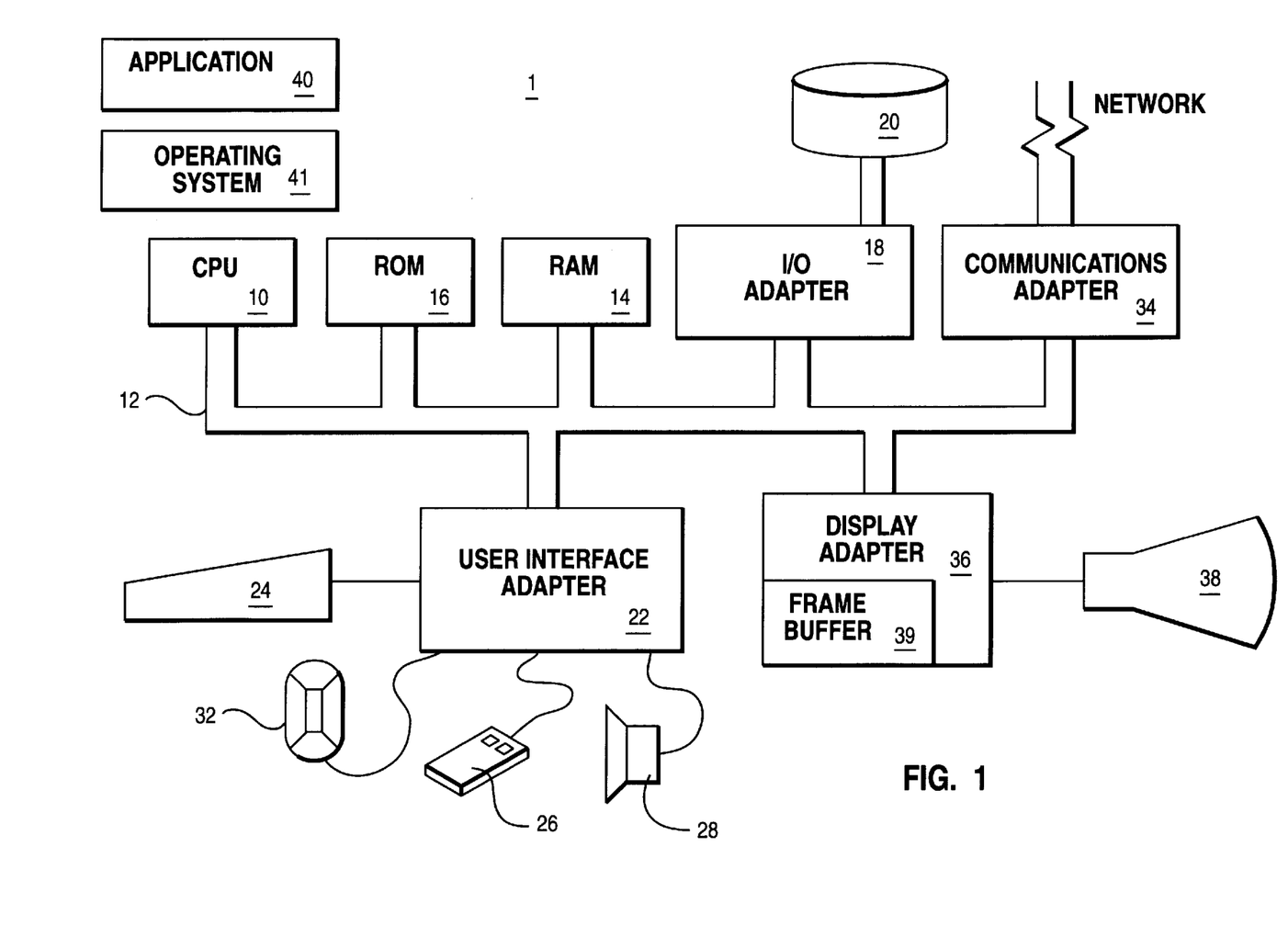
FIG. 1 is a block diagram of a data processing system including a central processing unit (CPU) which is capable of implementing the present invention.

Referring to FIG. 1, a typical data processing system is shown which may be used in conjunction with the present invention. A central processing unit (CPU), such as one of the PowerPC microprocessors available from IBM Corporation (PowerPC is a trademark of IBM) is provided and interconnected to various other components by system bus 12. An operating system 41 runs on CPU 10 and provides control and is used to coordinate the function of the various components shown in FIG. 1. Operating system 41 may be one of the commercially available operating systems such as DOS, or the OS/2 operating system available from IBM Corporation (OS/2 is a trademark of the IBM Corporation). A program application 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that there is software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. Input/output devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter, (not shown) and the like. By using the aforementioned I/O devices, a user is capable of inputting information to the system through the keyboard 24, trackball 32 or mouse 26 and receiving output information from the system via speaker 28 and display 38.

Figure 2:
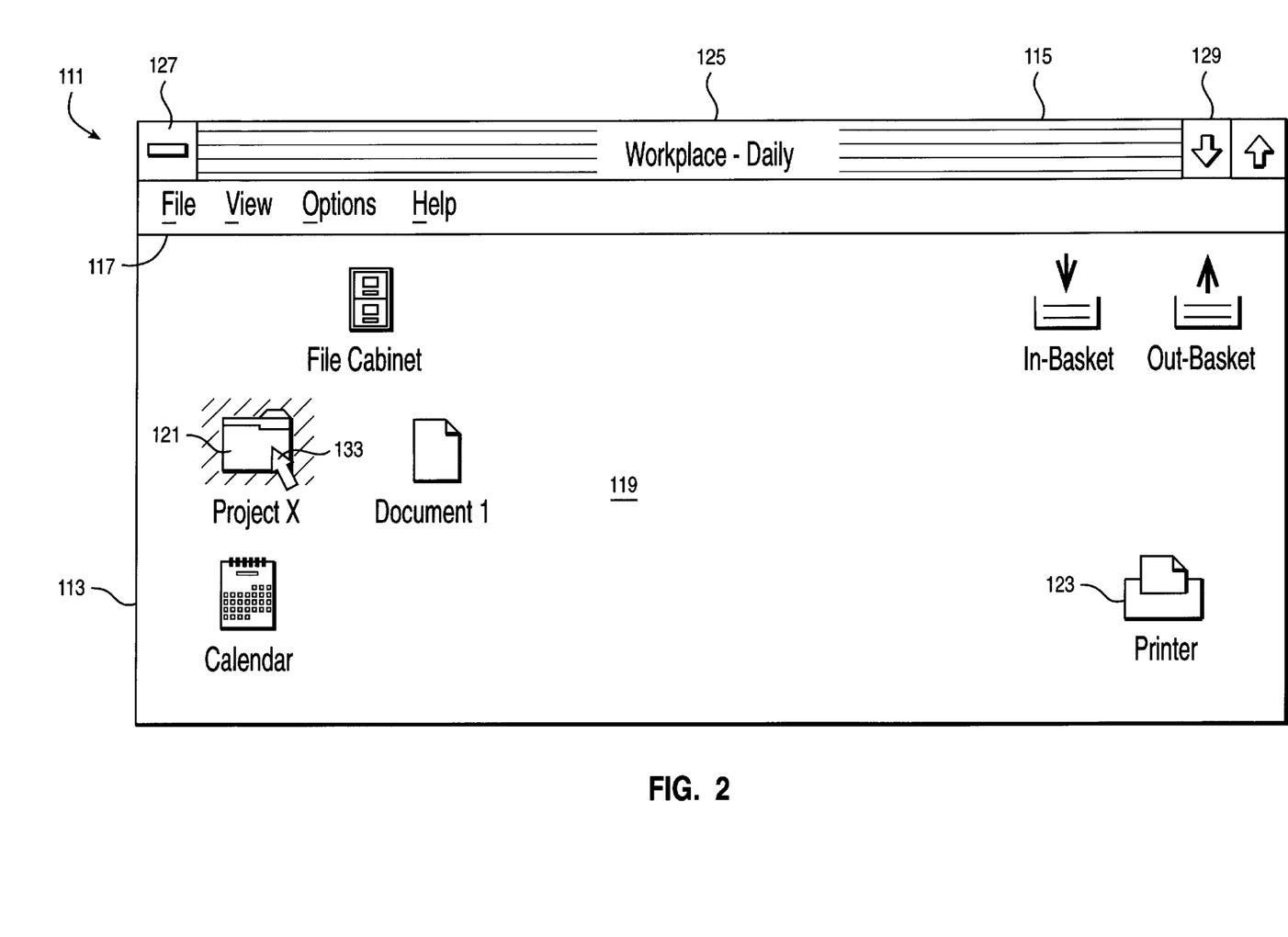
FIG. 2 shows a typical GUI with a workplace window having the various objects that are included on the user's workplace.

Referring to FIG. 2, the window is designated generally by the numeral 111. Window 111 includes a border with frame 113 that forms the outer boundary of the window. Contained within border 113 are a title bar 115 and an action bar 117. The remainder of window 111 consists of a client area 119, which is populated with a plurality of icons, including a folder icon 121, which is labeled "project X", and a printer icon 123.

Title bar 115 includes a window title 125 which identifies the window, a system menu icon 127 and window sizing icon 129. System menu icon 127 allows the user to display a pull-down menu containing actions that the user can perform on the window. Such actions are related to the window itself and not to the object that is displayed in the window. For example, actions include MOVE, which allows the user to reposition the window on the screen, MINIMIZE, which reduces the window's size, and MAXIMIZE, which enlarges the window to the size of the screen. Window sizing icon 129 provides a fast way to use a mouse or pointing device 133 to perform the actions of MINIMIZE and MAXIMIZE without requiring a menu.

Action bar 117 contains a list of the actions of the application shown in the window. Each action in the list in the action bar has an associated pull-down menu to list the individual actions that are contained within each general action listed in the action bar 117. For example, the FILE pull-down enables the user to work with files through actions that manipulate the file as a whole. The individual actions contained within the FILE action include NEW, which allows users to create a new file, and SAVE, which writes the existing file to a storage device.

Figure 3:
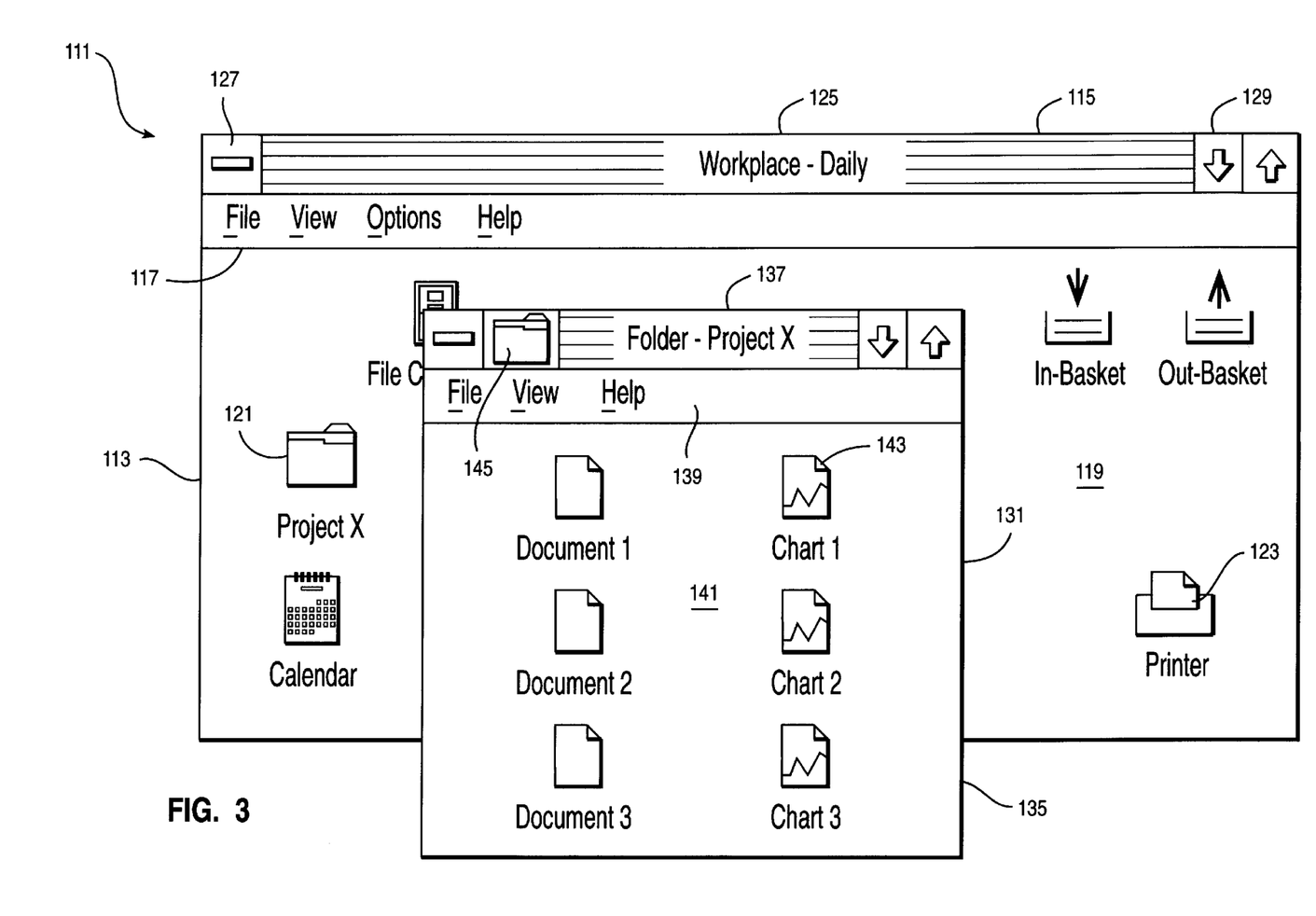
FIG. 3 is a more detailed representation of the GUI of FIG. 2 wherein the user has opened one of the objects on the workplace such that a window associated with that particular object is now displayed.

Turning now to FIG. 3, there is shown in addition to window 111, an object window 131. Object window 131 contains the contents of the "project X" folder represented by icon 121. Window 131 was opened by operating the pointer 133 to open icon 121.

Window 131 is similar to window 111 in that it includes a frame 135, a title bar 137, an action bar 139, and a client area 141 that is populated with a plurality of document and chart icons, including a "chart 1" icon 143. Title bar 137 of window 131 includes a title bar mini-icon 145 which is a copy of "project X" icon 121. Window title bar mini-icon 145 is placed in the title bar, rather than in the client area 141 of window 131, but is also capable of being directly manipulated by the user.

Figure 4:
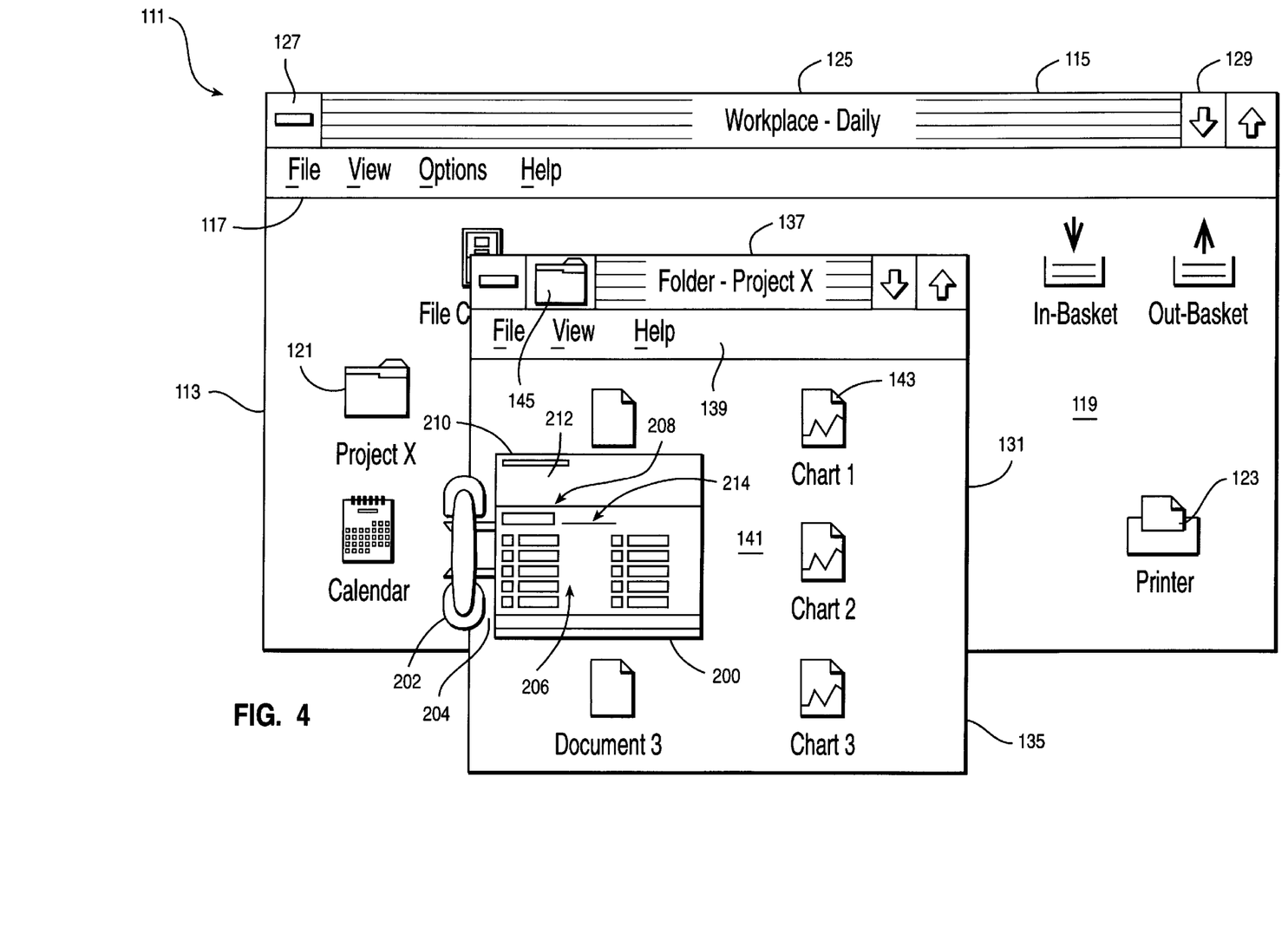
FIG. 4 is another detailed representation of the GUI of FIG. 2 showing the workplace window, the window corresponding to the open object of FIG. 3 and the real-world object of the present invention.

Referring to FIG. 4, workplace window 111 is once again shown having object window 131 opened such that a user can interact with the document associated with Project X. An additional window 200 has also been opened which is in the form of a "real world" window. In this example, real world object 200 is a representation of a telephone. It can be seen that telephone object 200 is surrounded by an irregularly shaped frame 210 which encompasses the object. Those skilled in the art will understand that FIG. 4 merely shows a telephone object as an example. Thus, the present invention is not limited to telephone objects, but contemplates all real world type objects which can be created using the system and methods of the present invention.

Telephone object 200 is seen to include a handset 202, speed dial functions 206 and a toggle switch 208. Further, it can be seen that the telephone object window 200 is irregularly shaped and includes curved and rounded edges which are known to be extremely difficult to render on the display of a data processing system. For example, it can been seen that the area 204 is not part of the telephone object 200, but is substantially enclosed by the distance between the handset and the body of the telephone object 200.

Further, it should be noted that telephone object 200 is not merely a bitmap representation of a telephone, but is a functional window in the same manner as workplace window 111 and object window 131. For example, the telephone may be answered upon receipt of an incoming call by clicking on handset 202. Additionally, a telephone number can be dialed by selecting one of the names associated with speed dial functions 206. An entry portion 212 allows a user to enter the number or numbers to be dialed when placing an outgoing call which has not been set up for speed dialing. A volume control 214 is provided as a slide switch that allows a user to control the sound volume which another party participating in a telephone call using object 200 can be heard. The preceding functions are given as examples of the types of controls available to be used when object 200 is a real world working telephone. Of course, other functions would be present when the object emulates other real world items, such as a fax machine, compact disk players, or the like.

Therefore, it can be seen when considering the functional elements of object 200 that this telephone represents an operational window in the same manner as window 111 and 131. However, the real world object 200 does not include such control items as action bar 117, title bar 137, action bar 139, window sizing icons 129 or the like. That is, the functionality provided in a conventional window by such items as title bars, action bars and pull-down menus, is provided by the real world functional controls of, in this case, a telephone. For example, to place a call the user clicks on handset 202 when using the present invention. In normal real world calling, the user would physically pick up the handset to begin speaking. Thus, there is a direct correlation between the action that a user of the present invention implements and the real world action that a person placing a telephone call on a physical telephone will make. Of course, the actions provided by telephone object 200 could be implemented in a non-real world object through the use of action bars, pull-down menus and selection of various operational actions, however, this conventional technique would require additional user actions and time before the desired result is obtained (placing a telephone call).

Figure 5A:
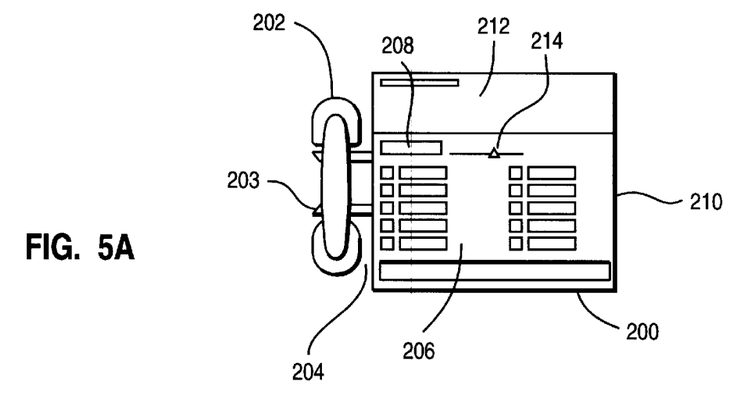
FIGS. 5A, 5B and 5C are various representations of the real-world object of the present invention in different functional states.

Next turning to FIG. 5, three separate telephone objects 200 are shown at various operational stages. In FIG. 5A, phone object 200 is shown essentially as was previously described with regard to FIG. 4. Therefore, FIG. 5A will not be described again at this time.

Figure 5B:
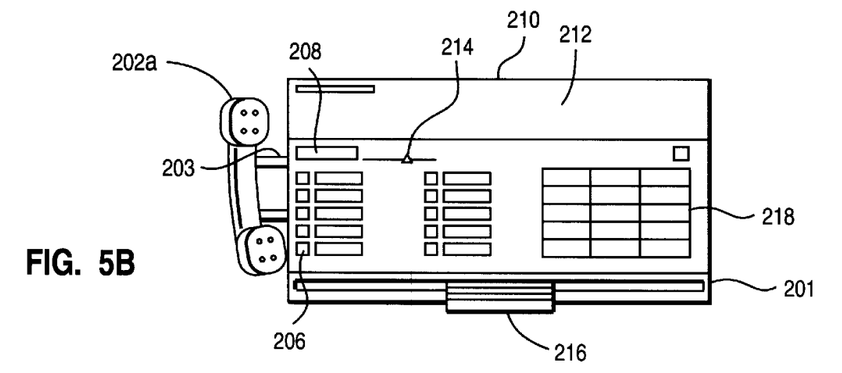

FIG. 5B is an enlarged version of telephone object 200 and shown by reference numeral 201. In addition to the various components shown by telephone object 200 of FIG. 5A, object 201 includes a number pad 218 which allows a user to enter telephone numbers to be called. Additionally, entry pad 218 includes a redial, flash and mute buttons for performing other functions associated with a real world telephone. Again, toggle switch 208 is shown which is used to display a different representation of the telephone object 201, such as changing between a two-dimensional and three-dimensional object. Handset 202a is shown in the active state since it is turned to face a user and is not shown as resting on cradle 203. A pullout drawer handle 216 is shown which allows additional functions to be presented to a user of telephone object 201. By selecting the arrow associated with pullout drawer 216, drawer 228 is opened. In this case, the functions included in drawer 228 relate to setting speed dial numbers and buttons 206. Name field 220 allows a user to enter the name of the person to be added to one of the speed dial buttons 206. Number field 222 allows a user to enter the telephone number to be associated with the name of the person previously entered in field 220. The name and number is then included in a list box 226 which associates the name and telephone number with one another. Functional keys 224 then allow the user to associate the entered name and number with one of the speed dial buttons 206. Additionally functional buttons 224 allow a user to select various operations such as dialing the person just added to the speed dial function, delete a person's name and number from the speed dial function, or the like. Upon completion of the speed dial activity, a user selects drawer tab 216 and the drawer is then closed such that the telephone object 201 of FIG. 5c returns to the appearance shown in FIG. 5b, as previously described.

Figure 6:
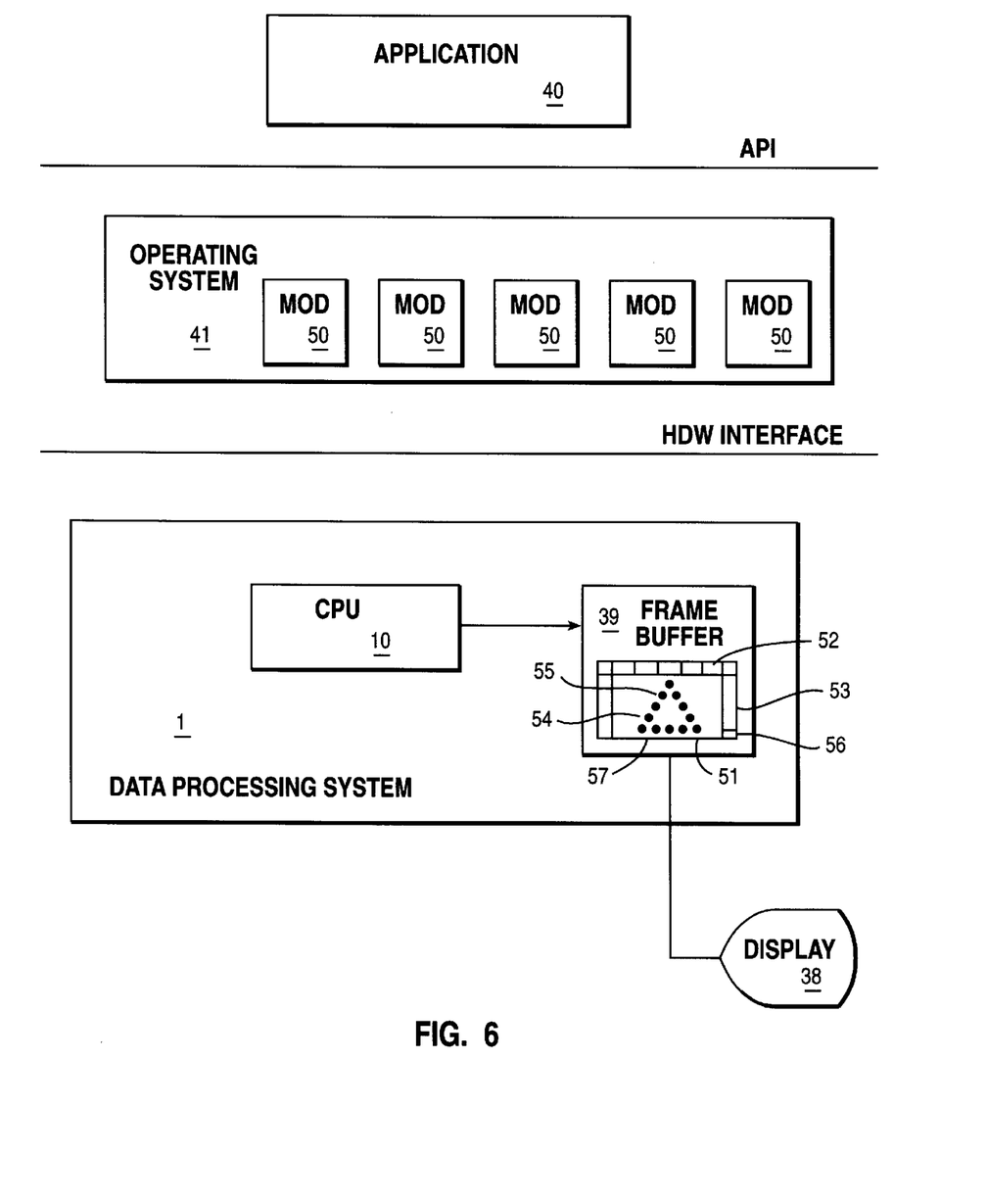
FIG. 6 is an architectural diagram of the various components which implement the present invention.

Referring to FIG. 6, an architectural block diagram is shown with application 40 running on top of an operating system 41. Application 40 may include one of the word processing applications, such as WordPerfect, Word, WordPro, or the like. Application 40 interacts with an operating system 41 through an application programming interface (API). Operating system 41 may include one of the Window's operating system from Microsoft Corporation, as well as OS2 from the IBM Corporation. Application 40 calls various functional routines included within operating system 41. These routines are shown as modules 50 included in the operating system. In the case of the Window's operating system, modules 50 can be characterized as dynamic link libraries (DLLs) which interpret a call from the application 40 and then, in response thereto, perform the desired function. For example, application 40 may issue a draw triangle command. Operating system 41 then routes this command to the appropriate module 50 that performs the draw triangle function. The appropriate module 50 then outputs hardware instructions to data processing system 1 to implement the draw triangle command. Operating system 41 and data processing system 1 interact through a hardware interface. A compiler outputs the hardware instructions to the data processing system 1, particularly central processing unit 10 where the instructions are decoded and executed on various processing, or execution units in the CPU (not shown). As noted in FIG. 1, data processing system 1 includes a frame buffer 39 located in display adapter 36. Frame buffer 39 is a storage device which holds information relating to each picture element (pixel) of a display screen 38. The information in frame buffer 9 corresponding to each individual pixel will cause that pixel to be painted, with a particular color or shade. The information stored in frame buffer 39 is then provided to a monitor 38 for display to a user of the data processing system.

In particular, frame buffer 39 may store information relating to a window 51 to be rendered on display 38. Conventional window 51 would include elements such as a title bar 52, border 53, sizing element 56 such as an arrow, and the like. Next, the triangle 54 is shown displayed inside of window 51 by illuminating pixels 55 to form the shape of a triangle as requested by application 40. The present invention provides a window in the form of a real world object which does not include borders 53, title bar 52 and frame 57 of window 51.

In typical graphical user interfaces (GUIs), everything is presented in window form. In these GUIs, a window can consist of rectangular items including a size border, rectangular client, menu and title bar. The rectangular client is typically a window such as the object window 131 previously described with regard to FIG. 3. The preceding items are not found in real world objects such as telephone, book, fax machine, or the like that sits upon a user's desk. Ideally, real world objects appearing on a GUI desktop should be assimilar to what is found in real life as possible.

To create real world objects on a GUI desktop, we will begin with creation of an image of the object to be represented in some format such as a bitmap. This image will represent much of the form of the real world object.

As a first step in creating the real world object bitmap image, set the background pixels (those pixels that are not part of the real world object) of the bitmap all to the same color which is different from any color found in the real world object. Next, when loading the bitmap at runtime, parse the bitmap to create a region including the area that the real world object is found in the bitmap. This region is the union of a series of horizontal lines where each line maps to the pixels within the real world object on that line in the bitmap.

An application window (one with size borders, title bar, menu bar and the like) is then created on the desktop where the client size is the same dimensions as the bitmap. That is, the rectangular client will be of a size sufficient to encompass the bitmap image, wherein each of the four sides of the rectangular client will tangentially be in contact with a pixel of the bitmap image. The bitmap image will then be drawn within the client.

The clipping region of the application window is then set to be the same region that was created from parsing the bitmap. This function may be included in a particular operating system. As an example, the Windows '95 or Windows NT operating system uses a set windowrgn API. The use of this function results in everything except the area within the client including the bitmap region to be clipped out thus removing the window size borders, title bar, menu bar and the like. A real world object is now present and displayed on the GUI desktop.

Figure 5C:
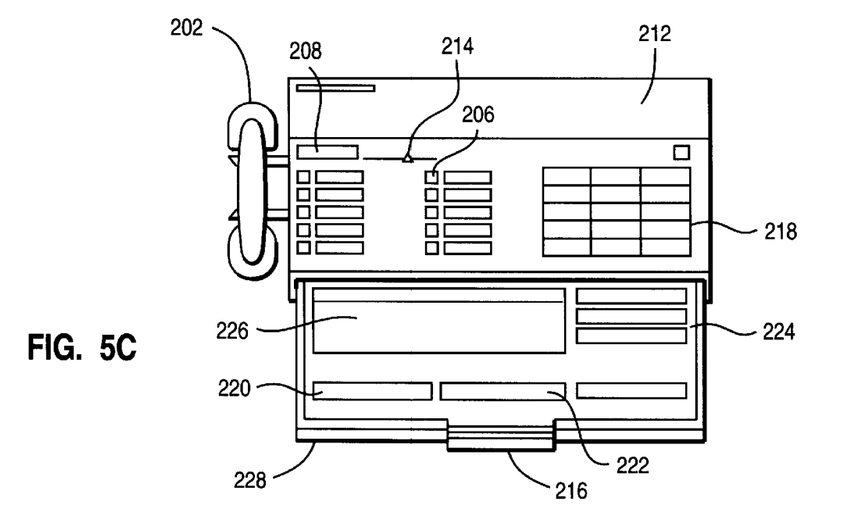
Figure 7:
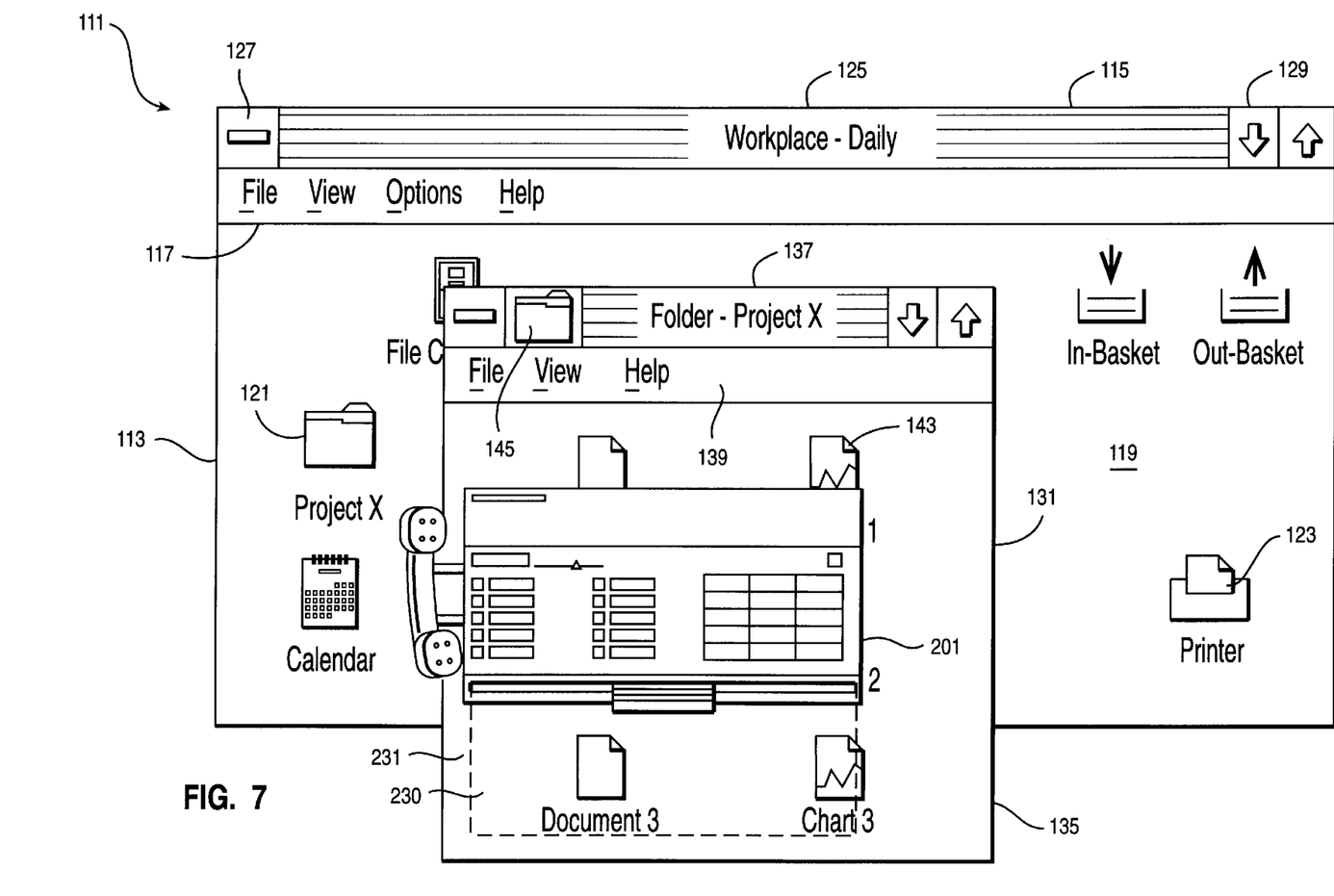
FIG. 7 is a representation of the workplace window and open object of FIG. 4 having a real world telephone object thereon that shows its area.
Figure 8:
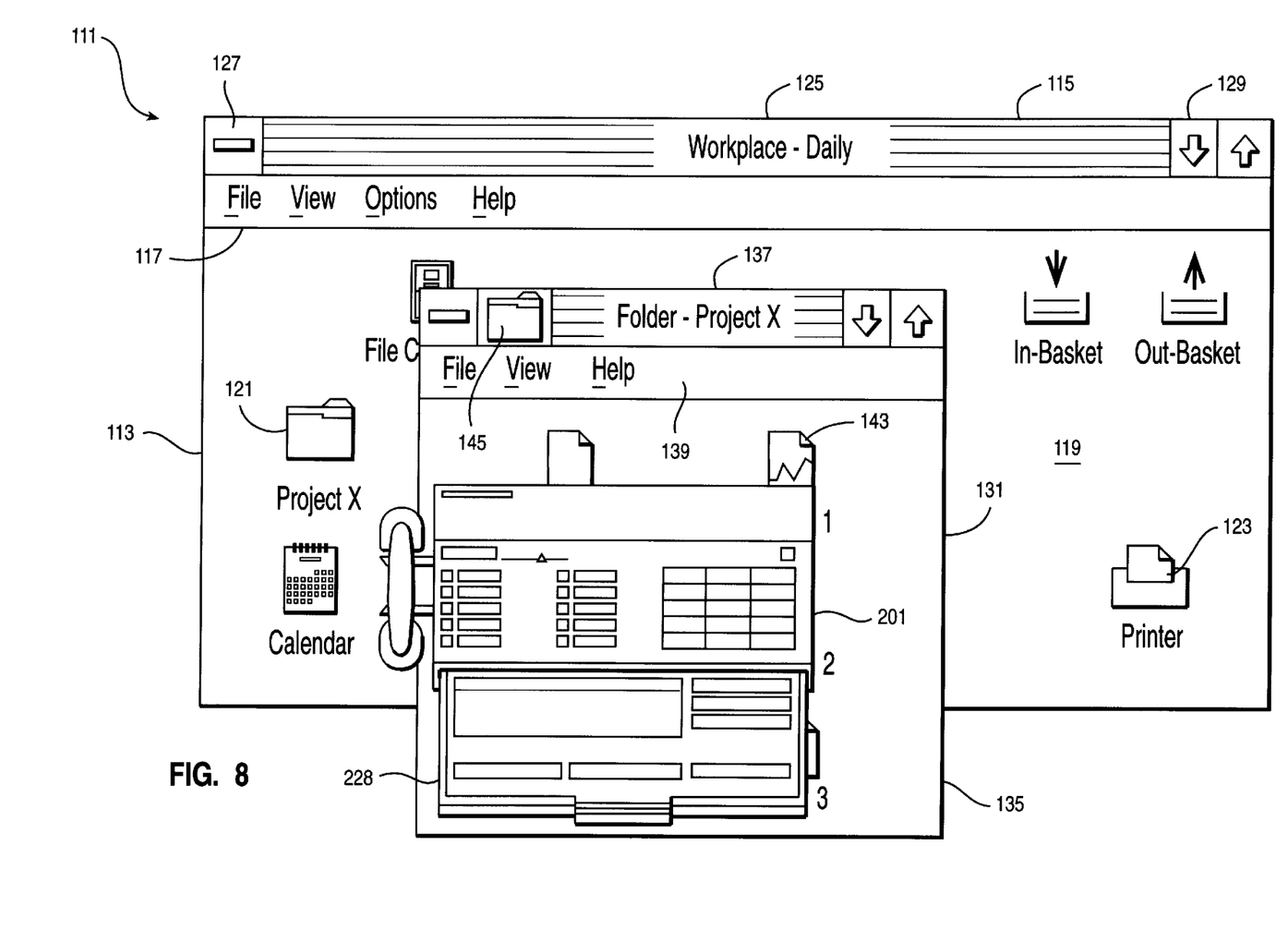
FIG. 8 is a the workplace window of FIG. 7 with the real world object having a different appearance to illustrate the area of the display obscured during an animation sequence.

Referring to FIG. 7, the workplace desktop window 111 and object window 131 are shown. Real world object 201, previously described with regards to FIGS. 5b and 5c, is shown above or overlying both desktop window 111 and object window 131. The functional aspects of real world object 201 have been previously described with regards to FIGS. 5b and 5c and for the sake of simplicity will not be described again at this time. The real world object 201 as shown in FIG. 5c and previously described is illustrated in FIG. 8. Again, it can be seen that object 201 is superimposed on both object window 131 and desktop window 111. In addition, drawer 228 has been opened by a user of the data processing system of the present invention. That is, referring to FIGS. 5b and 5c, a user has selected the pullout arrow 216 of 5b and pulled open drawer 228 as shown in FIG. 5c. The speed at which drawer 228 is opened is controlled by the motion of the user in conjunction with his selection device, e.g. a mouse. When a user desires for drawer 228 to be closed, drawer handle selection point 216 is again selected and the drawer is pushed close to obtain the image of real world object 201 as shown in FIG. 7. It can be seen that by opening and closing drawer 228, a portion 230 of the display is alternately obscured or revealed depending on the state of drawer 228. The peripheral line surrounding portion 230 is shown by reference numeral 231. Referring to FIG. 7, when drawer 228 is closed, the icon representing document 3 and a portion of the icon representing chart 3 are displayed. However, when drawer 228 is extended as shown in FIG. 8, the icon representing document 3 and the majority of the icon for chart 3 are hidden. Of course, there will be various intermediate stages between the points when drawer 228 is fully closed and fully extended. That is, when a user extends or closes drawer 228 there will be a point when the drawer is partially closed and only a portion of the document 3 icon will be shown. There are a virtually limitless number of stages between the fully extended and fully closed positions. In these cases the present invention will compute the various areas obscured by the drawer and determine which images are being exposed.

It should be noted that the present invention contemplates the case where drawer 228 has obscured a plurality of images and, when closed by a user, exposes these multiple images. In this case, each of the processes that generate the newly exposed images will be assigned a processing priority value having a higher relative value than the priority value of the drawer 228. This causes the processes corresponding to the underlying images to have higher priority during execution than the process corresponding to drawer 228. Thus, when the user closes the drawer the processing system will have already begun executing the processes corresponding to the underlying images, and these images will be visible and give a smooth, fluid, real world appearance. Of course, the present invention will determine the number of image(s) and corresponding processes for all newly exposed images in the area 231 that is computed for each drawer position selected by a user.

It can be seen from FIGS. 7 and 8 that the process which displays real world object 201 and the process or threads which display object window 131 will be contending for processing time in order to display area 230 of FIG. 7. Additionally, those skilled in the art will understand that when object 201 and object window 131 have the same priority, the thread relating to drawer 228 may have access to the processing unit while the object window 131 is waiting idle. Thus, as drawer 228 is closed (for example) the area 230 may not be painted in step with the closing of drawer 228. This is because the threads for object 131 are sharing time slices of the processing unit with the threads for object 201 and will lag behind or be out of step with the threads relating to object 201 and particularly the closing of drawer 228 by a user.

To solve this problem, the present invention implements a priority scheme wherein the threads associated with the underlying window, e.g. object 131, have a higher priority relative to the threads associated with real world object 201. Thus, as drawer 228 is closed by a user, the underlying process associated with window 131 will be more rapidly displayed than object 201 due to its higher relative priority.

Figure 9A:
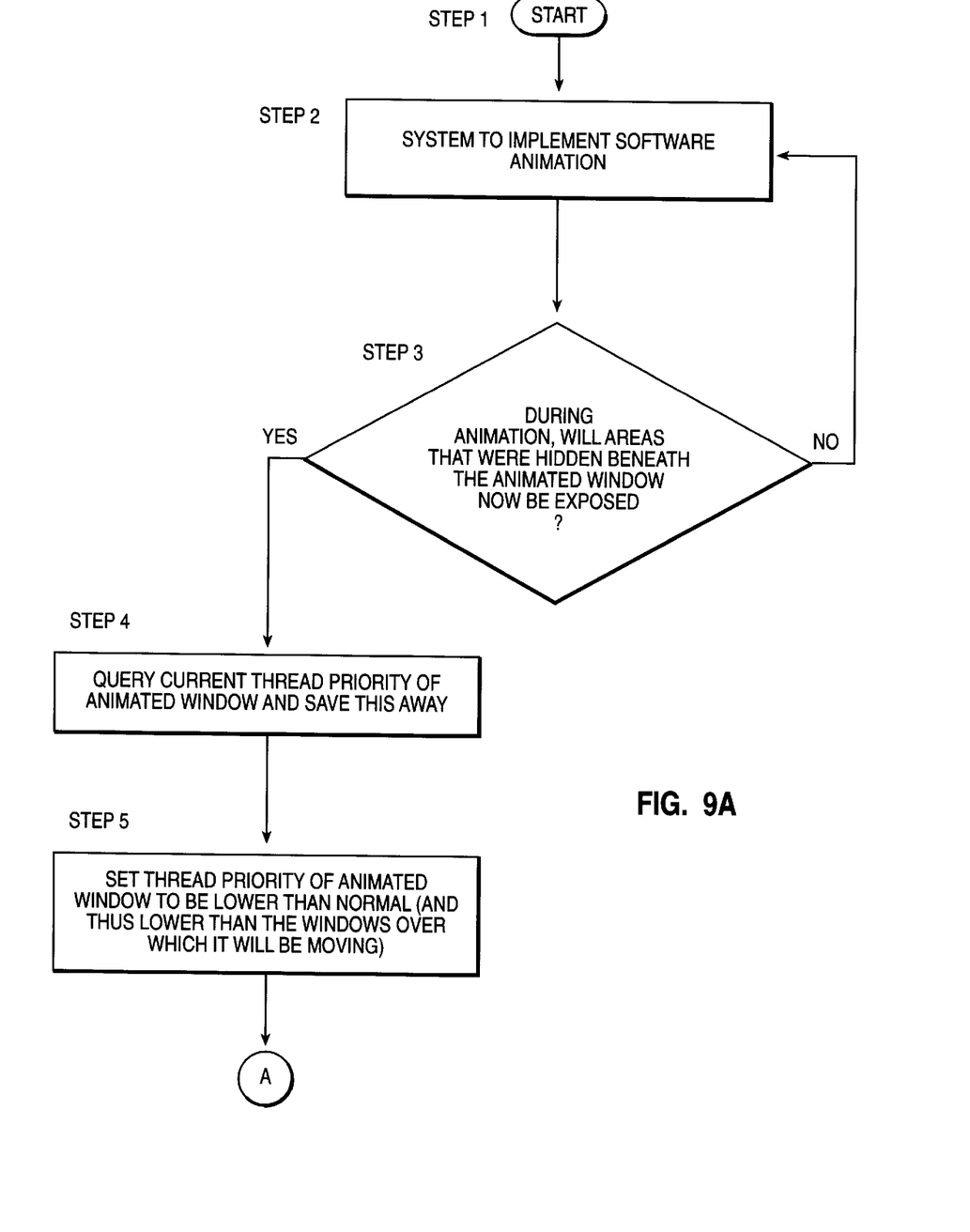
FIGS. 9A and 9B are flowcharts of the process implemented by the present invention to display a realistic animation sequence when the real world object is manipulated by a user.
Figure 9B:
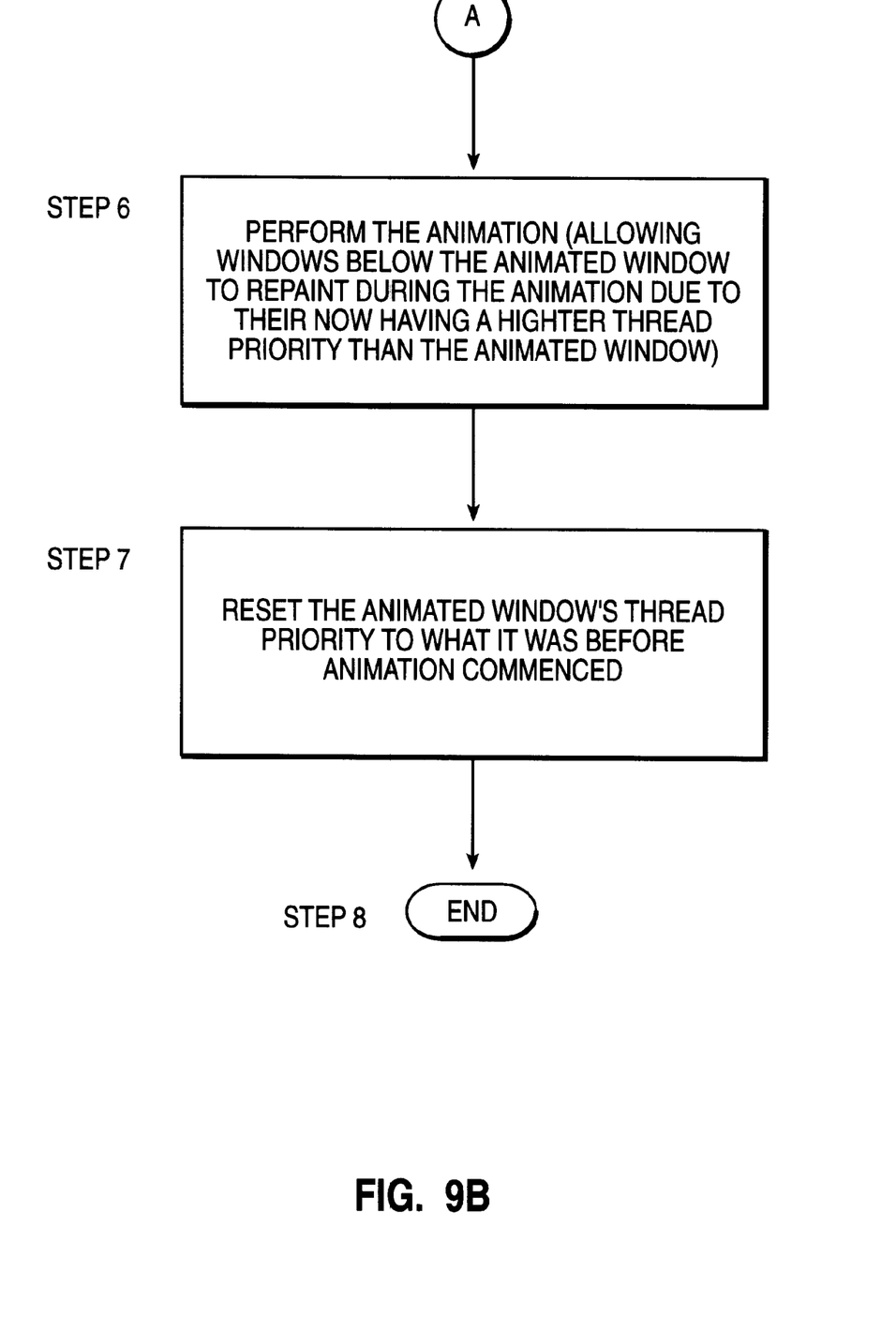

This process is shown in FIG. 9a where at step 1, the method is started and at step 2, the system is initialized to implement a software animation sequence. Step 3 determines whether there are areas that were hidden beneath the animated window that will now be exposed during the animation sequence. That is, will portion 230 now become exposed by the animation sequence, i.e. the closing of drawer 228. If there are no previously hidden areas that will now be exposed, the process loops back to step 2 and continues. However, if areas do exist that were previously hidden but will now be exposed due to the animation sequence, the process continues to step 4 to determine the current thread priority of the animated window (e.g. object 201 of FIG. 8). At step 5 the process sets the thread priority of the animated window to be lower than normal and thus lower than the windows over which the animated process will be moving. The animation is then performed at step 6. In this manner, the windows relatively below the animation window will be allowed to repaint quickly during the animation due to their higher relative thread priority than the animated window. Subsequent to the performance of the animation at step 6, the animated windows thread priority is reset to its previous state just prior to performance of the animation sequence as determined in step 4. Subsequent to step 7, the process of the present invention continues to step 8 and ends.

Although certain preferred embodiments have been shown and described it should be understood that many changes and modifications may be made therein without departing from the scope of the appended claims.

What is claimed is:

1. A multitasking data processing system that displays an animated image, generated by a first process, superimposed on at least one other image, generated by a second process, comprising:

means for determining whether said animated image will cause a previously obscured area of said other image to become visible; and means for assigning a first priority value to said first process which is relatively lower than a second priority value assigned to said second process;

wherein said data processing system executes said second process at a higher relative priority than said first process such that said other image is available for display when said animated image exposes said other image.

2. A system according to claim 1 wherein said means for determining comprises means for storing, before display of said animated image, an inital priority level for each of said first process and said second process.

3. A system according to claim 2 further comprising means for painting said animated image on a display screen of said multitasking data processing system.

4. A system according to claim 3 wherein said means for assigning comprises means for resetting said first process and said second process to the initial priority level subsequent to display of said animated image.

5. A system according to claim 4 wherein said means for determining further comprises means for computing an area of said other image being obscured by said animated image.

6. A system according to claim 5, further comprising means for determining whether a plurality of said other images, generated by a plurality of corresponding processes, are being displayed in said area being obscured by said animated image.

7. A system according to claim 6 wherein said means for assigning further comprises means for setting each of said plurality of corresponding processes to a priority value relatively higher than said first priority value of said first process such that said plurality of other images are available for display when said animated image exposes said plurality of other images.

8. A computer implemented method for displaying an animated image, generated by a first process, on a multitasking data processing system, said animated image being superimposed on at least one other image being generated by a second process, said method comprising the steps of:

determining whether said animated image will cause a previously obscured area of said other image to become visible; and assigning a first priority value to said first process which is relatively lower than a second priority value assigned to said second process;

wherein said data processing system executes said second process at a higher relative priority than said first process such that said other image is available for display when said animated image exposes said other image.

9. A method according to claim 8 wherein said step of determining comprises the step of storing, before display of said animated image, an inital priority level for each of said first process and said second process.

10. A method according to claim 9 further comprising the step of painting said animated image on a display screen of said multitasking data processing system.

11. A method according to claim 10 wherein said step of assigning comprises the step of resetting said first process and said second process to the initial priority level subsequent to display of said animated image.

12. A method according to claim 11 wherein said step of determining further comprises the step of computing an area of said other image being obscured by said animated image.

13. A method according to claim 12, further comprising the step of determining whether a plurality of said other images, generated by a plurality of corresponding processes, are being displayed in said area being obscured by said animated image.

14. A method according to claim 13 wherein said step of assigning further comprises the step of setting each of said plurality of corresponding processes to a priority value relatively higher than said first priority value of said first process such that said plurality of other images are available for display when said animated image exposes said plurality of other images.

15. A computer program including data structures stored on a computer readable media the causes an animated image, generated by a first process, to be displayed superimposed on at least one other image, generated by a second process, said computer program comprising:

means for determining whether said animated image will cause a previously obscured area of said other image to become visible; and means for assigning a first priority value to said first process which is relatively lower than a second priority value assigned to said second process;

wherein a data processing system will execute said second process at a higher relative priority than said first process such that said other image is available for display when said animated image exposes said other image.

16. A computer program according to claim 15 wherein said means for determining comprises means for causing, before display of said animated image, an inital priority level for each of said first process and said second process to be stored.

17. A computer program according to claim 16 further comprising means for causing a display screen of said data processing system to be painted with said animated.

18. A computer program according to claim 17 wherein said means for assigning comprises means for resetting said first process and said second process to the initial priority level subsequent to display of said animated image.

* * * * *